United States Patent Office 3,306,887
Patented Feb. 28, 1967

3,306,887
HOMOPOLYMERS OF AROMATIC AMINE ESTERS
OF DIHYDROPYRANS
Roy T. Holm and Paul H. Williams, Orinda, Calif., assignors to Shell Oil Company, New York, N.Y., a corporation of Delaware
No Drawing. Filed July 22, 1963, Ser. No. 296,488
19 Claims. (Cl. 260—88.3)

This invention relates to a novel class of polymeric materials and to novel monomers from which the polymers are produced. More particularly, it relates to novel esters and the homopolymers obtained therefrom which contain moieties of an aromatic amine and dihydropyran.

Considerable recent commercial emphasis has been placed upon the production of polymeric materials. Particular interest is evidenced with regard to polymers incorporating qualities of strength and resistance to heat, or alternatively with regard to thermoplastic polymers to be employed in the production of molded articles. The development of such polymeric materials and of monomers suitable for the production thereof is a matter of increasing importance.

It is therefore an object of this invention to provide a novel class of homopolymers, and the provision of novel monomers from which the polymers are produced. Further objects are to provide a novel class of compounds containing moieties of an aromatic amine and of a dihydropyran, and the homopolymers produced from these compounds.

It has now been found that these objects are accomplished in the present invention by the provision of novel esters wherein an amino-substituted aromatic moiety and a dihydropyran moiety are connected by a carbonyloxy linkage, and by the provision of the homopolymeric materials prepared therefrom.

The ester monomers of the present invention contain moieties of an aromatic amine and 3,4-dihydro-2H-pyran. Preferred esters have up to 40 carbon atoms and are represented by the formula

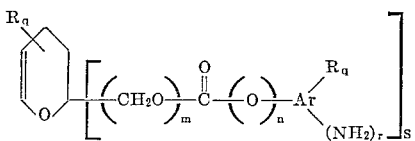

wherein R is alkyl, Ar is aryl, preferably mononuclear, $m$ and $n$ are whole numbers from 0 to 1 inclusive with the proviso that $m+n=1$, $q$ is a whole number from 0 to 4 inclusive, preferably 0 to 2, $r$ is a whole number from 1 to 3 inclusive, preferably 1, and $s$ is a whole number from 1 to 2 inclusive with the proviso that $s+n \leq 2$. Such compounds arise from the illustrative but not restrictive esterification processes diagrammed below.

(a)
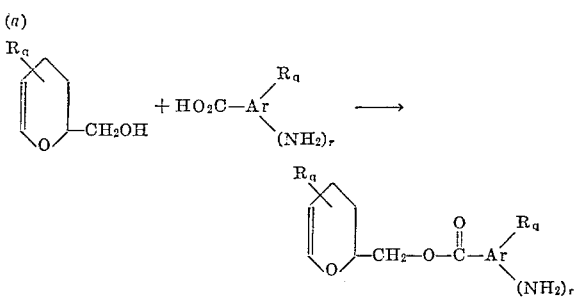

(b)
(c)
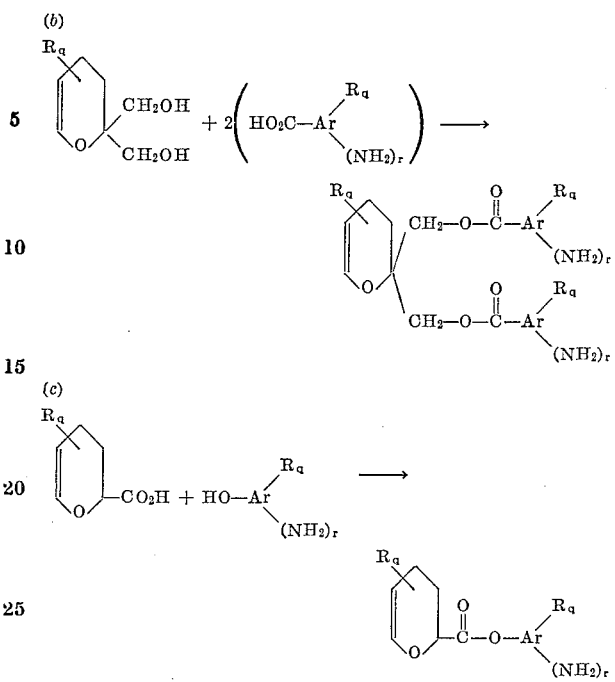

While esters of the three above-depicted types are useful in the production of the polymers of the invention, in general, monoesters, i.e., the ester products of Equations (a) and (c), are preferred over the diester products of Equation (b), and monoesters illustratively produced from aminoaromatic carboxylic acids and methylol-substituted dihydropyran, i.e., the illustrative product of Equation (a), are preferred over esters produced from dihydropyran - 2 - carboxylate and hydroxyl - substituted aminoaromatic compounds, i.e., the product type of Equation (c).

For simplification, the reactants employed in the illustrative equations are depicted above and discussed below in terms of carboxylic acids and hydroxylic compounds, the esterification of which results in the novel esters of the invention. It should be understood that analogous reactions of related starting materials, for example, corresponding carboxylate esters, carboxylic acid halides and anhydrides, metallic salts of the carboxylic acid or hydroxylic compound, or halides corresponding to the hydroxylic compound may be employed in alternate conventional esterification processes to produce equivalent or in some cases superior yields of ester product. Thus, the Equation (d) illustrates an alternate method for the production of the products of Equation (a).

(d)
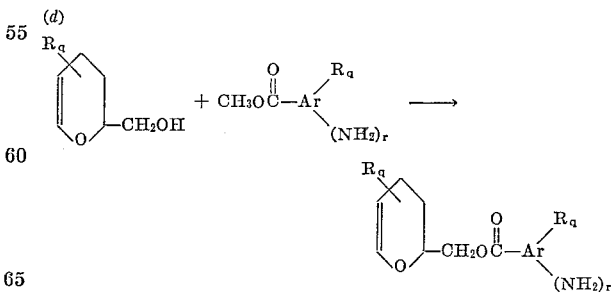

Within the above-depicted formulas, R is alkyl, preferably having from 1 to 10 carbon atoms. Illustrative of such alkyl radicals are methyl, ethyl, propyl, isopropyl, butyl, tert-butyl, hexyl, octyl and decyl radicals. More preferred are R groups having from 1 to 4 carbon atoms, and most preferred are the compounds wherein R is methyl. The dihydropyran and aromatic amine moieties are independently substituted with $q$ R groups, i.e., with 0 to 4 R groups, preferably 0 to 2, and still more preferred are the compounds wherein $q$ is 0. Ar represents an aromatic moiety, preferably aryl, and preferably having from 1 to 2 aromatic rings. When Ar is dinuclear, it is preferred that the two rings be fused, i.e., Ar is a naphthalene moiety, although Ar radicals derived from biphenyl are also suitable. In general, however, mononuclear Ar groups are preferred.

The illustrative dihydropyran reactant is a derivative of 3,4-dihydro-2H-pyran, that is, a 2-methylol-3,4-dihydro-2H-pyran, a 2,2-dimethylol-3,4-dihydro-2H-pyran, or a 2-carboxy-3,4-dihydro-2H-pyran. Illustrative 2-methylol-3,4-dihydro-2H-pyrans include 2-methylol-3,4-dihydro-2H-pyran, 2-methylol - 4-hexyl - 3,4-dihydro-2H-pyran, 2-methylol-3-methyl - 3,4-dihydro - 2H-pyran, 2-methylol - 2,5-dimethyl-3,4-dihydro - 2H-pyran, 2-methylol-3,5-dibutyl - 3,4-dihydro - 2H-pyran, 2-methylol-3,4,5-trimethyl - 3,4-dihydro-2H-pyran, 2-methylol-3-octyl-3,4-dihydro-2H-pyran and 2-methylol - 3,4-diethyl - 3,4-dihydro-2H-pyran. Exemplary 2,2-dimethylol-3,4-dihydropyrans are 2,2-dimethylol-3,4-dihydropyran, 2,2-dimethylol-4-methyl - 3,4-dihydropyran, 2,2-dimethylol-3,4-dibutyl-3,4-dihydropyran, 2,2-dimethylol - 5-hexyl - 3,4-dihydropyran, 2,2-dimethylol-3,5-diethyl - 3,4-dihydropyran, 2,2-dimethylol - 3-octyl - 3,4-dihydropyran, and 2,2-dimethlol - 4,5-dipropyl-3,4-dihydropyran. Suitable 2-carboxy-3,4-dihydro - 2H-pyrans include 2-carboxy-3,4-dihydro-2H-pyran, 2-carboxy-5-octyl-3,4-dihydro-2H-pyran, 2-carboxy - 4-methyl - 3,4-dihydro - 2H-pyran, 2-carboxy-3,4-dimethyl - 3,4-dihydro - 2H-pyran, 2-carboxy-3-ethyl-3,4-dihydro - 2H-pyran, 2-carboxy - 2,5-dimethyl-3,4-dihydro - 2H-pyran, 2-carboxy - 3,4,5-trimethyl - 3,4-dihydro - 2H-pyran and 2-carboxy-4-butyl-3,4-dihydro-2H-pyran.

The 3,4-dihydro-2H-pyran derivatives employed to produce the novel ester monomers are prepared by conventional methods, such as by the Diels-Alder condensation of the appropriately substituted $\alpha,\beta$-unsaturated aldehydes to produce a 2-formyl-3,4-dihydro-2H-pyran followed by further synthetic methods to produce the particular 3,4-dihydro-2H-pyran derivative desired. Illustrative of the production of 2-formyl-3,4-dihydro-2H-pyrans is the method of U.S. 2,479,284 by Whetstone. The 2-formyl-3,4-dihydro-2H-pyran is reduced by conventional methods, e.g., catalytic hydrogenation, to the corresponding 2-methylol derivative. Alternatively, the 2-formyl-3,4-dihydro-2H-pyran is oxidized to salts or esters of 2-carboxy-3,4-dihydro-2H-pyran by methods such as are described in U.S. 2,514,172 issued to Whetstone et al. The production of 2,2-dimethylol-3,4-dihydropyran from 2-formyl-3,4-dihydro-2H-pyran is illustrated by U.S. 2,980,703 issued to Dunlop et al.

The aromatic amine reactant employed in the production of the novel ester monomers of the invention is an amino-substituted aromatic carboxylic acid, an amino-substituted aromatic hydroxylic compound, or derivatives thereof capable of reacting in esterification processes in equivalent manner, e.g., the corresponding carboxylate esters, carboxylic acid chloride, or metal salt of the carboxylic acid or hydroxylic compound. Illustrative of amino-substituted aromatic hydroxylic compounds are p-aminophenol, o-aminophenol, 3,4-diaminophenol, 3-amino-5-methylphenol, 2,4-diamino-6-propylphenol, 2,5-diamino - 4-ethyl-6-methylphenol, 4-amino-2,3,5,6-tetramethylphenol, 2,4,6-triaminophenol, 4-amino-1-naphthol, 4,5-diamino-2-naphthol, 5,6-diethyl-7-amino - 1-naphthol, 4,5,7-triamino-3-propyl-2-naphthol, 4-amino-3,5,6,7-tetramethyl - 1-naphthol, p-(p-aminophenyl)phenol, 4-(3-amino-5-butylphenyl) - 3-amino - 6-butylphenol and 3-(4-aminophenyl) - 4-aminophenol. Exemplary amino-substituted aromatic carboxylic acids include p-aminobenzoic acid, m-aminobenzoic acid, 3,5-diaminobenzoic acid, 2,4-diamino-5-hexylbenzoic acid, 3-amino-4,5-dipropylbenzoic acid, 5-amino-1-naphthoic acid, 4,5-diamino-2-naphthoic acid, 3-amino-5-butyl-7-hexyl - 1-naphthoic acid, 4-amino-5,6,8-triethyl-2-naphthoic acid, 2,6-diamino-4,7-dipropyl-1-naphthoic acid, p-(m-aminophenyl)benzoic acid and m-(2,4-diaminophenyl)benzoic acid.

The process of conducting the esterification process will of course depend upon the particular derivatives of the carboxylic acid and hydroxylic compound employed. When a carboxylate ester is reacted with a hydroxylic compound, the esterification is customarily catalyzed by the addition of a small amount of base, e.g., alkali metal alkoxides or hydroxides. Alternatively, reaction of a free carboxylic acid and a hydroxylic compound is frequently catalyzed by a small amount of acid. The process of esterification is customarily conducted in solution in an inert solvent, such as a hydrocarbon, e.g., hexane, octane, cyclohexane, benzene, toluene, isooctane or decalin; an ether, e.g., dibutyl ether, diethyl ether, tetrahydrofuran, dioxane, dimethoxyethane or the dimethyl ether of diethylene glycol, or an ester such as ethyl acetate, methyl hexanoate, phenyl acetate or propyl butyrate. The carboxylic and hydroxylic compounds are mixed in any convenient ratio, and molar ratios of carboxylic compound to hydroxyl group from about 3:1 to about 1:3 are satisfactory. Frequently it is advantageous to employ a molar ratio of carboxylic compound to hydroxyl group that is substantially stoichiometric, that is, a ratio of about 1:1. Following esterification, the ester product is recovered from the product mixture by conventional means, such as by fractional distillation, fractional crystallization or selective extraction.

The novel esters of the invention comprise (1) amino-substituted aromatic carboxylate esters of a 2-methylol-3,4-dihydro-2H-pyran, as illustrated by 3,4-dihydro-2H-pyran-2-methyl o-aminobenzoate, 3,4-dihydro-2H-pyran-2-methyl p-aminobenzoate, 3,4-dimethyl-3,4-dihydro-2H-pyran-2-methyl 2,4-diaminobenzoate, 3,5-diethyl-3,4 - dihydro-2H-pyran-2-methyl 4-amino-1-napthoate, 4-hexyl-3,4-dihydro-2H-pyran-2-methyl 4,6-diamino-5,8-dimethyl-2-naphthoate, 3-methyl-5-propyl-3,4-dihydro-2H-pyran-2-methyl 3,5-diamino-2-propylbenzoate, and 3,4,5-triethyl-3,4-dihydro-2H-pyran-2-methyl m-(p - aminophenyl)benzoate and the like; (2) 3,4-dihydro-2H-pyran-2-carboxylate esters of amino-substituted aromatic hydroxylic compounds, such as p-aminophenyl 3,4-dihydro-2H-pyran-2-carboxylate, 3,5-diaminophenyl 3,4-dihydro-2H-pyran-2-carboxylate, 3-amino-4,5-dipropylphenyl 3,4-dimethyl-3,4-dihydro-2H-pyran-2-carboxylate 4-amino-3 - ethylphenyl 4-hexyl-3,4-dihydro-2H-pyran-2-carboxylate, 5-amino - 1-napthyl 3-butyl-3,4-dihydro-2H-pyran-2-carboxylate, 4,5,7-triamino-2-naphthyl 5-ethl-4-methyl - 3,4 - dihydro - 2H-pyran-2-carboxylate and p-(o-aminophenyl)phenyl 3,4-dihydro-2H-pyran-2-carboxylate; and (3) amino-substituted aromatic carboxylate esters of 2,2-dimethylol-3,4-dihydroaromatic pyrans such as 3,4-dihydropyran-2,2 - dimethyl di - (p-aminobenzoate), 3,4-dihydropyran-2,2-dimethyl di(3,5-diaminobenzoate), 3,4-dimethyl-3,4-dihydropyran-2,2-dimethyl di(4-amino-3-propylbenzoate), 5-hexyl-3,4-dihydropyran-2,2-dimethyl di(4-amino-7-octyl - 1 - napthoate), and 3,4-dimethyl-3,4-dihydropyran-2,2-dimethyl di(3,4,5-triamino-7-ethyl-2-naphthoate).

The novel esters of the invention are useful as monomers from which novel homopolymers are prepared. Precursors of most homopolymers not prepared by polymerization solely through olefinic linkages, i.e., polyolefins, have at least two reactive functional groups through which polymerization occurs to form the homopolymer, for example, an $\alpha,\omega$-aminoacid is employed to produce a polyamide, or an $\alpha,\omega$-hydroxyacid serves as a precursor for a polyester. The novel esters of the present invention have only one functional group that would obviously be reactive in homopolymerization processes, i.e., the primary aromatic amino group. Surprisingly, it appears that a hydrogen atom attached to the nitrogen of the amine substituent is capable of addition across the olefinic linkage of the dihydropyran moiety, and polymerization is believed to occur in this manner. The reaction is not general for all amines, however, as when the amino group is attached to an aliphatic carbon atom, analogous polymerization does not occur. In addition, efficient polymerization appears to be dependent upon the amino group being primary, that is, the nitrogen of the amino group having two hydrogen substituents. When the amino radical of the original ester monomer is secondary, that is, contains only one hydrogen substituent, polymerization is greatly retarded or does not occur at all.

Polymerization of the novel esters of the invention is accomplished by heating the ester in the presence of trace amounts of strong acid. Best results are obtained when the ester is treated with acid at a temperature above the melting point of the ester, and polymerization is effected by stirring the liquid ester with trace amounts of the strong acid. Alternatively, however, the acid may be mixed with a solid ester and the mixture heated to effect polymerization. Illustrative of suitable strong acids are hydrochloric acid, sulfuric acid, phosphoric acid, p-toluene sulfonic acid, trichloroacetic acid and strongly acidic ion exchange resins. Preferred for the purpose of initiating polymerization is hydrochloric acid. Regardless of the strong acid employed, only trace amounts of acid are required. Molar amounts of acid of about 0.01 mole of acid per mole of ester monomer are generally satisfactory, although greater amounts may be used, and lesser amounts are frequently satisfactory. The temperature at which polymerization is preferably conducted will be dependent upon the particular ester monomer employed, and the melting point thereof. Typical temperatures for the polymerization process are from about 75° C. to about 250° C.

The structure and physical properties of the polymers thus produced will be dependent upon the amine functionality of the ester, that is, the number of amino substituents upon the aromatic portion, as well as upon the steric hindrance afforded the amino group by other substituents on the amine moiety of the ester or by substituents upon the dihydropyran moiety with which it reacts. Thus, when the ester is polyfunctional, i.e., contains more than one amino substituent, or when the amino group is relatively unhindered, extensive cross-linking is observed and the polymer product is generally infusible and insoluble. However, when monoamino esters are employed wherein the amino group is sterically hindered by the presence of substituents upon adjacent carbon atoms, or when the initial amine-dihydropyran linkage is hindered by the presence of substituents upon the dihydropyran moiety, relatively little cross-linking is observed and the resulting polymer is soluble in organic solvents and melts when heated to elevated temperatures.

The utility of the novel polymers of the invention is of course dependent upon the physical properties of the particular polymer. Polymers with extensive cross-linking are infusible and insoluble and are suitable for castings, laminates, heat resistant adhesives and surface coatings, and are suitably employed in processes of encapsulation. Alternatively, polymers with little cross-linking are useful in the production of molded articles, particularly those articles produced by injection molding, and are useful as surface coatings and self-sustaining films.

To further illustrate the production of the novel esters of the invention and the novel polymers obtained therefrom, the following examples are provided. It should be understood that they are not to be regarded as limitations, for the teachings thereof may be varied as will be understood by one skilled in this art.

Example I

To a 500 ml. kettle equipped with a large distillation column were charged 100 g. (0.663 mole) of methyl p-aminobenzoate, 86 g. (0.75 mole) of 2-methylol-3,4-dihydro-2H-pyran, 200 ml. of toluene and 2 g. of sodium methoxide. The reaction mixture was heated until 26 g. of toluene-methanol azeotrope, B.P. 63° C., was distilled from the mixture. The residual liquid was washed with water and the resulting emulsion was separated with 4-5 times its volume of methyl ethyl ketone. The organic layer was removed and the aqueous phase extracted with ether. The combined organic phases were dried over magnesium sulfate and filtered, and the solvent was removed by distillation at reduced pressure. The residual liquid was vacuum distilled to afford, inter alia, 60 g. of material, B.P. 176–181° C., at 0.3 mm., which crystallized when cooled. The resulting solid was recrystallized twice from toluene-cyclohexane, to produce buff crystals of 3,4-dihydro-2H-pyran-2-methyl p-aminobenzoate, M.P. 110–114° C.

Example II

To a reactor equipped with a large spinning band distillation column were charged 200 g. (1.326 moles) of methyl o-aminobenzoate, 172 g. (1.5 moles) of 2-methylol-3,4-dihydro-2H-pyran, 400 ml. of toluene and 4 g. of sodium methoxide. The mixture was heated until 50 ml. of toluene-methanol azeotrope was distilled. The mixture was then diluted with about 500 ml. of chloroform and washed three times with 300 ml. portions of water. The combined water washings were extracted with three 150 ml. portions of chloroform. The organic solutions were combined, washed one time with water and dried over magnesium sulfate. The solution was then filtered and the solvent was removed by distillation at reduced pressure. The residual liquid, 413 g., was vacuum distilled to give 134 g. of liquid which boiled between 97° C. and 159° C. at 0.3–0.4 mm. This distillate was distilled through a small spinning band column to give 20 g. of 3,4-dihydro-2H-pyran-2-methyl o-aminobenzoate, B.P. 142–144° C. at 0.7 mm.

|  | Anal. Calc. | Found |
| --- | --- | --- |
| C, percent wt | 66.95 | 66.5 |
| H, percent wt | 6.44 | 6.8 |
| N, percent wt | 6.01 | 5.62 |
| Ester value, eq/100 g | 0.429 | 0.371 |
| Acidity, eq/100 g | 0.0 | 0.031 |

Example III

Following the procedure of Example I, when 2-methylol-3,4-dimethyl-3,4-dihydro-2H-pyran is esterified with methyl 4,5-diamino-1-naphthoate, 3,4-dimethyl-3,4-dihydro-2H-pyran-2-methyl 4,5-diamino-1-naphthoate is obtained in good yield.

Example IV

When methyl 4-hexyl-3,4-dihydro-2H-pyran-2-carboxylate is reacted with 3-amino-5-butylphenol, 3-amino-5-butylphenyl 4 - hexyl-3,4-dihydro-2H-pyran-2-carboxylate is obtained in good yield.

Example V

Good yields of 4-amino-2,5-diethylphenyl 3,4-dihydro-2H-pyran-2-carboxylate are obtained when 4-amino-2,5-diethylphenol is reacted with methyl 3,4-dihydro-2H-pyran-2-carboxylate in benzene solution in the presence of sodium ethoxide.

Example VI

When 2,2-dimethylol-4-methyl - 3,4 - dihydropyran is esterified with m-aminobenzoic acid, a good yield of 4-methyl-3,4-dihydropyran-2,2-dimethyl di(m-aminobenzoate) is obtained.

Example VII

When 3,4-dihydro-2H-pyran-2-methyl p-aminobenzoate (the product of Example I) was heated to 120° C. in an oil bath, the ester melted to a pale yellow liquid. When the molten ester was stirred with a wooden applicator stick the tip of which had been dipped in concentrated hydrochloric acid, the liquid polymerized to an opaque yellow solid almost immediately. The solid was insoluble in chloroform, dioxane, tetrahydrofuran and m-cresol. The solid charred and burned without melting upon heating.

*Example VIII*

When 3,4-dihydro-2H-pyran-2-methyl o-aminobenzoate (the product of Example II) was stirred with an applicator stick the tip of which had been dipped in concentrated hydrochloric acid and heated in an oven at 125° C., it thickened to a viscous orange liquid. The liquid set to a hard glass upon cooling which was soluble in methylene chloride and melted upon reheating.

*Example IX*

When 3,5-diaminophenyl 3,4-dimethyl-3,4-dihydro-2H-pyran-2-carboxylate is heated and then stirred with a trace amount of phosphoric acid, an insoluble, infusible polymeric product is obtained.

*Example X*

When 4-butyl-3,4-dihydropyran - 2,2 - dimethyl di(4-amino-3,5-dimethylbenzoate) is heated and stirred with a small amount of a sulfonic acid ion exchange resin, a polymeric material is obtained.

We claim as our invention:

1. A homopolymer of an ester monomer selected from the group consisting of aminoaromatic carboxylate ester of a 2-methylol-3,4-dihydro-2H-pyran, aminoaromatic carboxylate diester of a 2,2-dimethylol-3,4-dihydropyran, and a 3,4-dihydro-2H-pyran-2-carboxylate ester of aminoaromatic hydroxylic compound, wherein each of said aminoaromatic moieties has from 0 to 4 alkyl substituents and from 1 to 3 primary amino groups, and each of said dihydropyran moieties has from 0 to 4 alkyl substituents.

2. A homopolymer of a non- to tetra-alkyl and mono- to tri(primary amino) substituted aromatic carboxylate ester of non- to tetra-alkyl substituted 2-methylol-3,4-dihydro-2H-pyran.

3. A homopolymer of 3,4-dihydro-2H-pyran-2-methyl aminobenzoate.

4. A homopolymer of 3,4-dihydro-2H-pyran-2-methyl p-aminobenzoate.

5. A homopolymer of a non- to tetra-alkyl substituted 3,4-dihydro-2H-pyran-2-carboxylate ester of non- to tetra-alkyl and mono- to tri(primary amino) substituted aromatic hydroxylic compound.

6. A homopolymer of p-aminophenyl 3,4-dihydro-2H-pyran-2-carboxylate.

7. A homopolymer of o-aminophenyl 3,4-dimethyl-3,4-dihydro-2H-pyran-2-carboxylate.

8. A homopolymer of a non- to tetra-alkyl and mono- to tri(primary amino) substituted aromatic carboxylate diester of non- to tetra-alkyl substituted 2,2-dimethylol-3,4-dihydropyran.

9. An ester selected from the group consisting of amino-aromatic carboxylate ester of a 2-methylol-3,4- dihydro-2H-pyran, amino-aromatic carboxylate diester of a 2,2-dimethylol-3,4-dihydropyran and a 3,4-dihydro-2H-pyran-2-carboxylate ester of aminoaromatic hydroxylic compound wherein each of said aminoaromatic moieties has from 0 to 4 alkyl substituents and from 1 to 3 primary amino groups, and each of said dihydropyran moieties has from 0 to 4 alkyl substituents.

10. The non- to tetra-alkyl and mono- to tri(primary amino) substituted aromatic carboxylate ester of non- to tetra-alkyl substituted 2-methylol-3,4-dihydro-2H-pyran.

11. The compound 3,4 - dihydro - 2H - pyran-2-methyl aminobenzoate.

12. The compound 3,4-dihydro-2H-pyran-2-methyl p-aminobenzoate.

13. The compound 3,4-dimethyl-3,4-dihydro-2H-pyran-2-methyl 2,4-diaminobenzoate.

14. The non- to tetra-alkyl and mono- to tri(primary amino) substituted aromatic carboxylate diester of non- to tetra-alkyl substituted 2,2-dimethylol-3,4-dihydropyran.

15. The compound 3,4-dihydropyran-2,2-dimethyl di(aminobenzoate) wherein the di(aminobenzoate) moiety is selected from di(m-aminobenzoate) and di(p-aminobenzoate).

16. The non- to tetra-alkyl substituted 3,4-dihydro-2H-pyran-2-carboxylate ester of non- to tetra-alkyl and mono- to tri(primary amino) substituted aromatic hydroxylic compound.

17. The compound aminophenyl 3,4-dihydro-2H-pyran-2-carboxylate wherein the aminophenyl moiety is selected from o-aminophenyl and p-aminophenyl.

18. The compound p-aminophenyl 3,4-dihydro-2H-pyran-2-carboxylate.

19. The compound aminophenyl 3,4-dimethyl-3,4-dihydro-2H-pyran-2-carboxylate wherein the aminophenyl moiety is selected from o-aminophenyl and p-aminophenyl.

No references cited.

JOSEPH L. SCHOFER, *Primary Examiner.*

H. I. CANTOR, *Assistant Examiner.*